(12) United States Patent
Mita et al.

(10) Patent No.: US 6,337,889 B1
(45) Date of Patent: Jan. 8, 2002

(54) PARTIAL RESPONSE DEMODULATING METHOD AND APPARATUS USING THE SAME

(75) Inventors: Seiichi Mita, Kanagawa-ken; Hideki Sawaguchi, Kodaira; Naoya Kobayashi; Masaharu Kondo, both of Odawara, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/124,840

(22) Filed: Jul. 30, 1998

(30) Foreign Application Priority Data

Aug. 4, 1997 (JP) .............................. 9-208820

(51) Int. Cl.[7] .......................... H04L 27/06; G11B 5/035
(52) U.S. Cl. .......................... 375/341; 375/263; 360/65
(58) Field of Search .................. 375/263, 262, 375/290, 340, 341, 229, 232, 350; 360/65; 714/794, 795; 708/300, 319, 322, 323

(56) References Cited

U.S. PATENT DOCUMENTS 5,585,975 A * 12/1996 Bliss ........................... 360/65

* cited by examiner

*Primary Examiner*—Betsy L. Deppe
(74) *Attorney, Agent, or Firm*—Antonelli, Terry, Stout & Kraus, LLP

(57) ABSTRACT

In a data demodulating method, predetermined input data is based upon a response characteristic of the partial response class 4. The predetermined input data is discrete-filtered to thereby produce filtered asymmetrical data. The filtered asymmetrical data is maximum-likelihood-decoded to thereby produce decoded data that is demodulated. Further, a magnetic recording/reproducing apparatus is arranged by using this data demodulating method.

16 Claims, 12 Drawing Sheets

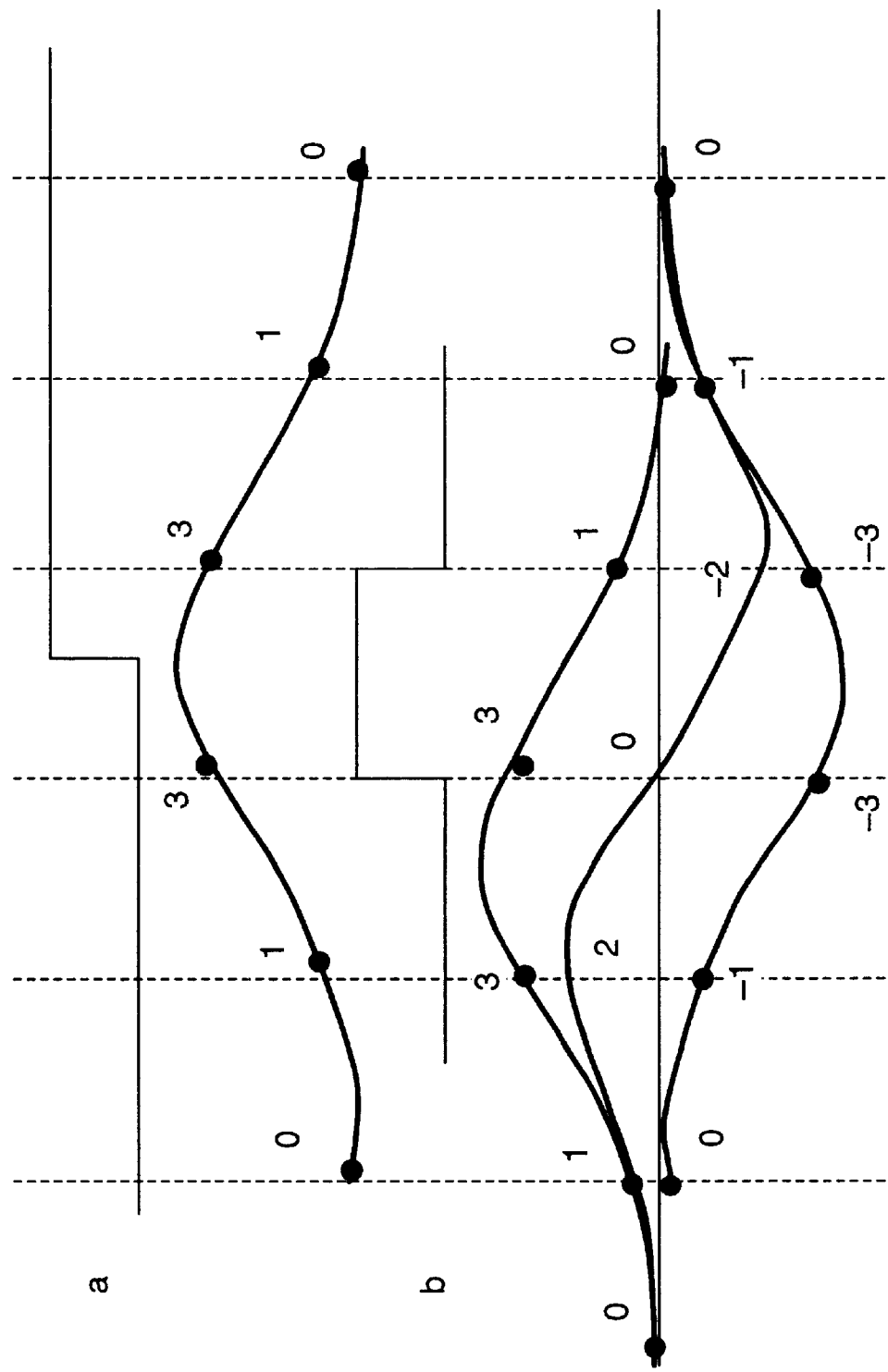

| $s_k$ | $a_k/y_k$ |
|---|---|
| 0000 | 0/"0"<br>1/"1" |
| 0001 | 0/"2"<br>1/"3" |
| 0010 | 0/"0"<br>1/"1" |
| 0011 | 0/"2"<br>1/"3" |
| 0100 | 0/"-2"<br>1/"-1" |
| 0101 | 0/"0"<br>1/"1" |
| 0110 | 0/"-2"<br>1/"-1" |
| 0111 | 0/"0"<br>1/"1" |
| 1000 | 0/"-1"<br>1/"0" |
| 1001 | 0/"1"<br>1/"2" |
| 1010 | 0/"-1"<br>1/"0" |
| 1011 | 0/"1"<br>1/"2" |
| 1100 | 0/"-3"<br>1/"-2" |
| 1101 | 0/"-1"<br>1/"0" |
| 1110 | 0/"-3"<br>1/"-2" |
| 1111 | 0/"-1"<br>1/"0" |

$y_k = a_k + 2a_{k-1} - 2a_{k-3} - a_{k-4}$ $s_k = a_{k-4} a_{k-3} a_{k-2} a_{k-1}$ $(\alpha - \beta)^2 = (1-0)^2 + (2-1)^2 + (1-2)^2 + (1-1)^2 + (2-1)^2 + (1-2)^2 + (0-1)^2$
$= 6$ $(\alpha - \beta)^2 = 8$

FIG.9A
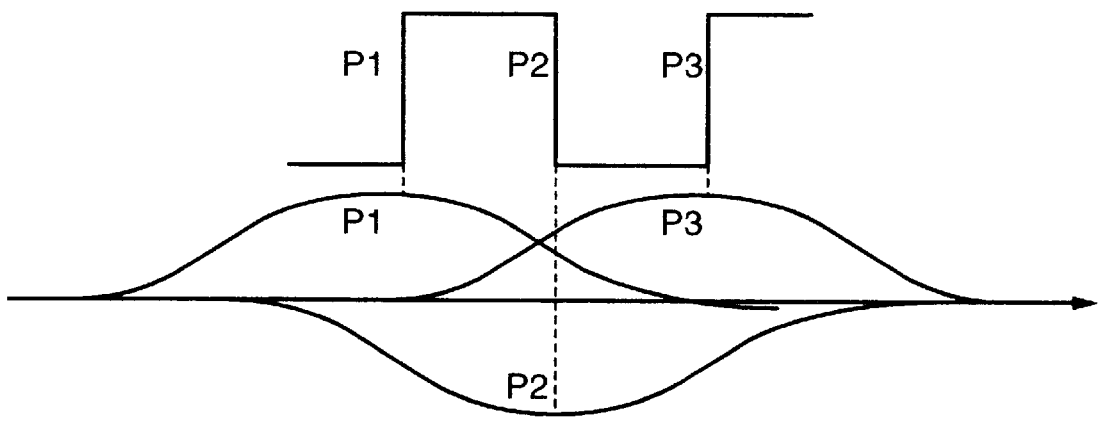
FIG.9B
(a)
| 1 | 3  | 3  | 1  |    |   |
|---|----|----|----|----|---|
|   | 1  | 3  | 3  | 1  |   |
|   | -1 | -3 | -3 | -1 |   |
| 1 | 2  | 1  | 1  | 2  | 1 |
(b)
| 1 | 3  | 3  | 0 |   |   |
|---|----|----|---|---|---|
|   | 1  | 3  | 3 | 0 |   |
|   | -1 | -3 | -3| 0 |   |
| 1 | 2  | 1  | 0 | 3 | 0 |
FIG.10
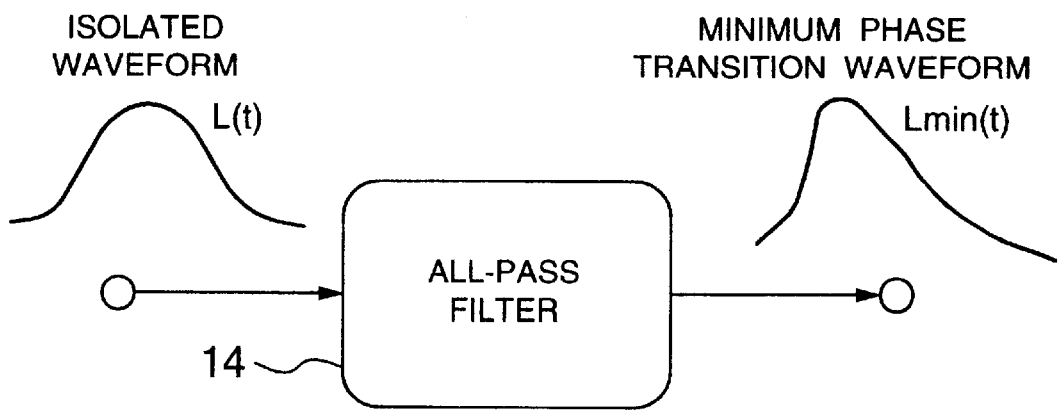

D : 1-BIT DELAY CIRCUIT

| $s_k$ | $a_k/y_k$ |
|---|---|
| 0000 | 0/"0"<br>1/"3" |
| 0001 | 0/"2"<br>1/"5" |
| 0010 | 0/"-2"<br>1/"1" |
| 0011 | 0/"0"<br>1/"3" |
| 0100 | 0/"-2"<br>1/"1" |
| 0101 | 0/"0"<br>1/"3" |
| 0110 | 0/"-4"<br>1/"-1" |
| 0111 | 0/"-2"<br>1/"1" |
| 1000 | 0/"-1"<br>1/"2" |
| 1001 | 0/"1"<br>1/"4" |
| 1010 | 0/"-3"<br>1/"0" |
| 1011 | 0/"-1"<br>1/"2" |
| 1100 | 0/"-3"<br>1/"0" |
| 1101 | 0/"-1"<br>1/"2" |
| 1110 | 0/"-5"<br>1/"-2" |
| 1111 | 0/"-3"<br>1/"0" |

$y_k = 3a_k + 2a_{k-1} - 2a_{k-2} - 2a_{k-3} - a_{k-4}$ $s_k = a_{k-4} a_{k-3} a_{k-2} a_{k-1}$

PARTIAL RESPONSE DEMODULATING METHOD AND APPARATUS USING THE SAME

CROSS-REFERENCE TO RELATED APPLICATION

The present application relates to subject matter described in U.S. application Ser. No. 08/975,670, filed Nov. 28, 1997 entitled "INFORMATION RECORDING/REPRODUCING METHOD AND APPARATUS USING EPRML CONNECTION PROCESSING SYSTEM" now U.S. Pat. No. 6,069,856, the disclosure of which is hereby incorporated by reference.

BACKGROUND OF THE INVENTION

The present invention is generally related to a signal processing system for either a magnetic disk apparatus or an optical disk apparatus. More specifically, the present invention is directed to a high-efficiency demodulating method of a high-order partial response system such as an EEPRML (Extended Extended Partial Response Maximum Likelihood) signal processing system and an EEEPRML (Extended EEPRML) signal processing system.

In magnetic disk apparatuses, the partial response maximum likelihood (will be abbreviated as a "PRML" hereinafter) signal processing system combining the partial response class 4 (PR4) and the maximum-likelihood decoding system are practically available as a high-efficiency signal processing system. A high-efficiency signal processing system implies a system capable of realizing a desirable data error rate at a low SIN (signal-to-noise) ratio. Very recently, such high order partial response systems have been practically utilized as signal processing systems capable of reproducing signals at SIN ratios lower than that of the PRML system, for instance, the EPRML system by combining the EPR4 (Extended PR4) with the maximum (most) likelihood decoding system.

FIG. 1 shows a structural example of the construction of a general magnetic disk apparatus using a PRML signal processing system. Original data is supplied to an error correcting encoder 7 through an interface circuit 8 so that the original data is added with redundant data necessary for error correction. Next, the original data added with redundant data is subjected by a data modulator 6 to modulation necessary for the PRML system and is recorded on a magnetic disk 3 by a magnetic head 4 through a recording/reproducing amplifier 5. A signal reproduced from the magnetic disk 3 is passed through the recording/reproducing amplifier 5 and then PRML-processed by a data demodulator 1. The demodulated data is error-corrected by an error correcting decoder 2 and is thereafter converted through the interface circuit 8 into the original data. The operation and the arrangement of this data modulator 6 and data demodulator 1 will now be explained in more in detail with reference to FIG. 2 indicating a relationship between a magnetic recording/reproducing system and a partial response system. A first description will now be made of process operations executed on the data recording side. The data outputted from the error correcting encoder 7 is penetrated through a precoder 9 constructed of a delay element and modulo (Mod. 2), and then is recorded via a recording amplifier S on a recording medium. This precoder 9 is employed so as to prevent erroneous propagation of data which is caused during the demodulating operation.

Next, a description will now be made of a processing operation on the reproducing side. The magnetization on the recording medium is reproduced as a waveform having a differential characteristic by the recording/reproducing head. PR4 may regard this differential characteristic as a differential system of (1−D). In this case, symbol "D" implies a 1-bit delay calculator. The reproduced waveform is supplied to the equalizer 10 so as to be equalized in such a manner that a response of the waveform becomes (1+D). As a result, a total transfer characteristic in the output of the equalizer becomes (1−$D^2$). Thereafter, a data discrimination of the data is carried out in the maximum decoder 11. FIG. 3 represents a response of a regenerative isolated waveform (note that a step response will be simply referred to as an "isolated waveform" hereinafter) in the case that a step waveform is magnetically recorded. PR4 implies that the isolated waveform is regarded as a waveform enlarged to 2 time slots, as indicated in FIG. 3A. This waveform owns such a characteristic having (1+D). Also, as indicated in FIG. 3B, EPR4 implies that the isolated waveform is regarded as a waveform enlarged to 3 time slots. This waveform owns such a characteristic having $(1+D)^2$. Furthermore, as indicated in FIG. 3C, EEPR4 implies that the isolated waveform is regarded as a waveform enlarged to 4 time slots. This waveform owns such a characteristic having $(1+D)^3$.

While considering the EEPR4 system as an example, the high order partial response system will now be summarized. A total transfer characteristic of EEPR4 constitutes (1−D)•$(1+D)^3$ as a product of a transfer characteristic of an isolated waveform and another transfer characteristic of a magnetic recording system. An impulse response of the EEPR4 system determined by this product is represented in FIG. 4. As apparent from a waveform "a" shown in FIG. 4, an isolated waveform of EEPR4 owns amplitude characteristics (normalized ratio) of 1, 3, 3, 1 every bit period. As a consequence, as indicated in a waveform "b" of FIG. 4, a response of an isolated pulse is obtained by superimposing the isolated waveforms inverted along the upper/lower directions with each other by shifting a 1-bit time period. In other words, the response of the isolated pulse becomes 1, 2, 0, −2, −1. In FIG. 5, there is shown a trellis diagram of EEPRML obtained by combining a maximum likelihood decoder with EEPR4. As is well known in this field, the operation of the EEPRML system may be explained based upon the trellis diagram. In the drawing, symbol "ak" indicates an input signal to EEPRML at a time instant "k". In this case, reference numeral 12 indicates a state, and reference numeral 13 shows a state transition. An upper stage of a label (ak/yk) and a lower stage thereof indicate an input signal value and an output signal value, respectively. The states of the respective signal processing systems are determined by the past input signal series. In EEPRML, a level of a reproduction signal at the present time instant is influenced by signals over the past 4 time slots. Assuming now that a state at a time instant "k" is equal to "sk", it is given as sk=((ak−4, ak−3, ak−2, ak−1)1ak(1,0)), and a total number of states becomes 16. At a time instant "k−1", state transitions originated from a plurality of states are collected to a specific state at the time instant "k". With respect to these state transitions, a squared value of a difference between an output signal and an input signal, which are indicated at a low stage of each label, will be referred to as a "branch metric". Also, an accumulated value of branch metrics until the present time instant with respect to each of the states will be referred to as a "path metric". Among the state transitions collected to a specific-state at the time instant "k", only such state transitions that a summation becomes a minimum value and this summation is made from path metrics until a time instant "k−1" and branch metrics corresponding to the respective state transitions are selected as a state transition (path) capable of satisfying a maximum likelihood condition (most certain). This stage may be subdivided into the below-mentioned steps. In other words, the path metrics are added to the branch metrics (Add). Next, these added values are compared with each other every state, and such a state transition which becomes a minimum value is selected (Select). A series of these operations will be abbreviated as an "ACS". The maximum (most) likelihood decoding method is such well-known method that this ACS operation is repeatedly performed at each time instant and under each state, and then when the path metrics are finally converged onto one path on the trellis diagram, the data is determined.

The performance of EEPRML is determined by a minimum free distance (Dfree). In this case, "Dfree" implies a minimum difference of path metrics among various sorts of combinations from a specific node to another specific node on the trellis diagram shown in FIG. 5. It is known that "Dfree" of EEPRML is equal to 6. Furthermore, distances between signals subsequent to "Dfree" become 8 and 10. These distances between signals of EEPRML are determined by a data pattern entered into the maximum likelihood decoder. In particular, a distance between-signals is defined by a continuous time at which a pattern is changed from 0 to 1, or from 1 to 0. As will be discussed later, assuming now that an inverting position contained in a pattern is expressed by, for example, "p", in such a case that 2 sorts of patterns are set under 1-bit shifted condition, and these patterns own 3-time continuous inverting positions such as "p+p", a distance between these patterns may give "Dfree". To further improve the performance of these EPRML system and EEPRML system, very recently, Maximum Transition Run Code (will be abbreviated as an "MTR code", hereinafter) has been proposed.

For instance, the conventional MTR code is described in, for example, "Maximum Transition Run Codes for Data Storage Systems", IEEE Transactions on Magnetics, volume 32, No. 5, September 1996, pages 3992 to 3994. The above-described MTR code owns a function to restrict that inverting of a pattern occurs more than 3 times. When this MTR code is used, a limitation can be made to the pattern inversion for more than 10 distances between signals of EEPRML. As a consequence, an S/N ratio of a signal can be equivalently improved. However, in the MTR code, the code rate becomes 4/5 and the like. This code rate value is low, as compared with the normally used 16/17 GCR (Group Coded Recording) and 8/9 GCR. As a result, a code rate loss becomes large, and a total coding gain cannot be always satisfied. Concretely speaking, a gain becomes approximately 2.2 dB, since the distance between signals is improved-from 6 to 10. on the other hand, a code rate loss becomes larger than approximately 1 dB under normalized line density=3, for instance, (normalized line density=a half bandwidth of a reproduced waveform is normalized by a width of a recording pulse), and a total coding gain becomes at maximum approximately 1 dB, depending upon a recording density of a magnetic disk.

SUMMARY OF THE INVENTION

An object of the present invention is to provide a generally-used method for expanding the distance between signals of a high order partial response system, especially, the EEPRML system and the EEEPRML system irrespective of a code under use. In other words, an object of the present invention is to provide a method for equivalently expanding a distance between signals without newly producing a code rate loss, since the 16/17 GCR, or the 8/9 GCR used in the PRML signal process operation for a magnetic disk apparatus can be directly applied.

In accordance with the present invention, in the high order partial response system, especially the EEPRML system and the EEEPRML system, a response of an isolated pulse waveform is changed from the original response of EEPRML, or EEEPRML, so that the distance between signals can be expanded. In the high order partial response system, a response of an isolated pulse is selected to be an symmetrical waveform. For instance, as previously described, in the EEPRML system, the response of the isolated pulse waveform becomes 1, 2, 0, −2, −1.

In accordance with the present invention, since the asymmetrical characteristic owned by the response of the isolated pulse waveform in such a high order partial response system is relaxed, the distance between signals is firstly extended. This distance between signals determines the S/N ratio when the signal is discriminated. It is implied that the longer this distance between signals becomes, the larger the amplitude of the signal equivalently becomes. Secondly, the noise power is reduced. The noise of the partial response owns correlative relationships with each other over plural time instants. The performance of the maximum likelihood decoder is deteriorated by the adverse influence caused by this correlative relationship of the noise. As a result, the noise can be essentially reduced by suppressing the correlative characteristic of the noise. In other words, an S/N ratio of a high order partial response signal is defined by the following formula:

$$S/N = \text{distance between signals}/(\text{noise power} \times \text{noise correlative coefficient}) \quad (1).$$

While considering the EEPRML system, the present invention will now be explained with a concrete example. A code is equal to a binary number of {1, 0}. Now, in order to defame a dimension of a code error, a value of 1 corresponds to such an error case that 1 erroneously becomes 0; a value of −1 corresponds to such an error case that 0 erroneously becomes 1; and a value of 0 corresponds to such an error case that no error occurs. The error patterns of the EEPRML system are classified in accordance with this definition:

(A). In a case that the distance between signals=6 (1, −1, 1).

(B). In a case that the distance between signals=8:
    1) (1,−1,1,0,0,1,−1,1)
    2) (1,−1,1,−1,1).

(C). In a case that the distance between signals=10: (0, 1, 0) etc.

An actual code error pattern of (A) is such a case that (a, b, 1, 0, 1, c, d) erroneously becomes (a, b 0, 1, 0, c, d), or vice versa.

An actual code error pattern of (B) 1) is such a case that (1, 0, 1, a, b, 1, 0, 1) erroneously becomes (0, 1, 0, a, b, 0, 1, 0), or vice versa.

An actual code error pattern of (B) 2) is such a case that (1, 0, 1, 0, 1, 0, 1) erroneously becomes (0, 1, 0, 11 0, 1), or vice versa. In this case, symbols "a", "b", "c", and "d" are arbitrary.

(C) is a 1-bit isolated pulse error.

As previously described, with respect to the patterns commonly applied to (A) and (B), the signals are inverted at least 3 times. As a consequence, in the data pattern, either "ab1010cd" or "ab0101cd", and also these data patterns are continued. FIG. 6 represents that the error of the distance between signals=6 is plotted on a trellis diagram. Two sorts of data streams "α" and "β", shown in FIG. 6 own such values of "010abcde" and "101abcde". That is, only 3 bits thereof are different from each other. FIG. 7 indicates waveforms corresponding to these data streams. As apparent from this drawing, a distance between signals of the two sorts of patterns is 6. Similarly, FIG. 8 represents a waveform corresponding to the above-described (B) 1).

On the other hand, EEPRML has a transfer characteristic of $(1-D) \cdot (1+D)3$. As a result, as illustrated in the waveform "b" of FIG. 4, an impulse response is determined by 1, 2, 0, −2, −1. Therefore, in the case that a 1-bit error happens to occur, a distance between signals for the erroneous pattern and the pattern originally having no error becomes 10, namely equal to a squared summation of the respective values of this impulse response. This distance between signals is equal to energy itself owned by this impulse signal. As a consequence, the reason why there is such a pattern of the distance between signals=6, or the distance between signals=8, as indicated in FIG. 7 and FIG. 8 is given as follows. That is, a combination of these patterns is to cancel the energy owned by the original impulse signal. In other words, the EEPRML system involves such a pattern that an erroneous propagation readily occurs. A further consideration will now be made of the cause why such a distance between signals is decreased with reference to a waveform diagram shown in FIG. 9A and an impulse response indicated in FIG. 9B. This diagram shows a pattern whose distance between signals becomes 6 in EEPRML indicated in FIG. 7. In this pattern, as shown in FIG. 9A, inverting of the signal is continued 3 times, namely P1, P2, P3. As a result, as indicated in FIG. 9B(a), isolated waveforms having responses 1, 3, 3, 1 are alternately repeated in such a manner of positive-negative-positive. As a consequence, such a response of 1, 2, 1, 1, 2, 1 is obtained, and energy of this signal becomes a squared summation of the respective values, namely $(1)^2+(2)^2+(1)^2+(1)^2+(2)^2+(1)^2=12$. On the other hand, signal energy of each of isolated waveform single body becomes $(1)^2+(3)^2+(3)^2+(1)^2=20$. Accordingly, in such a pattern that inverting of signals is continued 3 times, namely P1, P2, P3, a total signal energy of the 3 isolated waveforms, i.e., 60 is reduced to 12. For example, as shown in FIG. 9B(b), when the response of the isolated waveform having the amplitude of 1 located at the right end is eliminated from the responses of the isolated waveforms, the distance between signals may be increased up to 15. This implies that since the responses 1, 3, 3, 1 of the isolated waveforms in EEPRML are excessively extended to a plurality of bits, the original energy of the signal is canceled in the specific patterns shown in-the above-described (A) and (B). This reason may cause the distance between signals to be essentially reduced. As a result, the erroneous propagation is induced.

Based upon this consideration, the essential aspect in order to enlarge the distance between signals is to establish a measure how to concentrate energy without losing the energy (electric power) of the isolated waveform. In general, as shown in FIG. 10, a means for concentrating energy of a signal an isolated waveform is filtered by an all-pass filter 14 to satisfy a minimum, phase transition condition, which could be cleared based on the communication theory. In this case, a minimum phase transition condition implies that a zero point and a pole of a transfer function of a signal given by a rational function are present within the same unit circumference. Since a phase filter is set so as to satisfy this condition, energy of a signal can be concentrated to a front half portion of an impulse response while the energy of this signal is reserved. In a magnetic recording operation, it is well known that an isolated waveform can be approximated by way of the Lorentz waveform. When this is given by L(t), it is expressed by the below-mentioned formula (2):

$$L(t)=1.0/(1+(2t/TW)2) \qquad (2)$$

where symbol "TW" gives a half bandwidth.

As apparent from this formula (2), L(t) is a symmetrical waveform with respect to right/left directions. In this case, a ratio (TW/T) of a half bandwidth to a time width T of a pulse to be recorded is defined as a normalized line density. When the value of this ratio TW/T is increased, the waveform may be recorded in the high density. Normally, in the magnetic recording operation, such a Lorentz waveform whose normalized line density is selected to be approximately 2.5 is used. It is now assumed that waveforms produced by filtering a Lorentz waveform having a normalized line density of 2.5 and another Lorentz waveform having a normalized line density of 3.0 by a minimum phase transition filter is recognized as L min(t), FIG. 11 indicates L min(t). As apparent from FIG. 11, the waveforms are symmetrical with each other along the right/left directions. Also, it can be understood that the energy is concentrated to the front half portion of the isolated waveform. However, generally speaking, it is very difficult to extract a clock signal (timing signal) required to discriminate a signal from an asymmetrical waveform. As one of these reasons, a jitter component (temporal fluctuation) depending upon a pattern is increased due to a phase distortion. As another reason, since the signal amplitude has multi-values, the clock signal (timing signal) extracting circuit becomes complex. This practical reason makes it difficult. As a consequence, according to the present invention, in order to solve—this contradictory condition, the polynomial PR(D) of the high order partial response is factorized in accordance with the following formula (3):

$$PR(D)=(1-D^2) \cdot (C_0+C_1D+ \ldots +C_nD_n) \qquad (3)$$

The above-described asymmetric characteristic is given to the waveform by such a manner that the timing extraction is carried out under condition of a front term in a right hand, and thereafter an asymmetrical response given by a rear term in the right hand is given by the discrete time filter. At this time, a selection is made of such asymmetrical coefficients $C_0$, $C_1$, $C_n$ that the S/N ratio given by the formula (1) becomes maximum.

Next, a description will now be made of an actual method for calculating the asymmetrical coefficients. In a first case of 16 states in EEPRML, the above-explained asymmetrical coefficients are given as ($C_0=1$, $C_1=2$, $C_2=1$). In other words, the value of $C_0$ and the value Of $C_2$ constitute symmetrical coefficients, while setting $C_1$ as a center. To the contrary, in order to calculate the asymmetrical coefficient, first of all, a rear term of a right hand of the formula (3) is set as mornic polynomial of $C_0=1$. Assuming now that the coefficients $C_1$ and $C_2$ are regarded as 2 variable functions of a real number, an optimum coefficient is calculated in accordance with the evaluation basis of the formula (1). Therefore, an integer coefficient most approximated to this real number is calculated. It should understood that since the methods for calculating the distance between signals, the noise power, and the noise correlative coefficient indicated in the formula (1) are described in detail in the publication "Maximum Likelihood Sequence Estimation of Digital Sequences in the Presence of Intersymbol Interference", IEEE Transactions on Information Theory, vol. IT-18, No. 3, May 1972, pages 363 to 378, descriptions thereof are omitted. A table 1 represents a typical characteristic of such a partial response that a state number thereof is 16. A distance of an isolated pulse indicated in this table 1 is directly equal to electric power owned by the isolated pulse itself. A minimum distance corresponds to such minimum distance among distances on a trellis diagram of partial response signal having given coefficients. As a consequence, a distance of the minimum distance/isolated pulse may constitute an index for there is a particular improvement in the characteristic. It should also be noted that the characteristics of the table 1 and the table 2 correspond to such a case that the normalized line density is 2.5. Furthermore, according to the present invention, not only the S/N ratio can be improved, but also the length of the code error can be improved, as compared with the long continued errors caused by the conventional EEPRML and EEEPRML systems. That is, giving the utilization efficiency of the energy of the partial response for giving this distance. The partial response system having the coefficient according to the present invention may have the advantages as to this point, as compared with that of the normal EEPRML. As a result, it can be seen that the S/N can be effectively improved with respect to the EEPRML having the symmetrical coefficient. A table 2 represents a typical characteristic of such a partial response that a state number thereof is 32. Also, in this case, according to the present invention, the major error bit length is the 1-bit error bit length, or the 3-bit error bit length. As a consequence, the present invention has such a feature that the error correction can be effectively performed by combining with the error correction code having the code error correcting capability with respect to at least the 1-bit continuous error, and the 3-bit continuous error.

BRIEF DESCRIPTION OF THE DRAWINGS

For a more better understanding of the present invention, reference is made of a detailed description to be read in conjunction with companying drawings, in which:

FIG. 4 is a graphic representation for indicating the conventional isolated wavefortn of EEPR4 and the conventional isolated pulse response;

FIG. 9A and FIG. 9B are diagrams for indicating the reason why the conventional distance between signals of EEPRML is reduced to 6;

FIG. 10 schematically represents a basic idea for concentrating energy of isolated waveform responses of a partial response according to an embodiment of the present invention;

DESCRIPTION OF THE PREFERRED EMBODIMENTS

Figure 1:
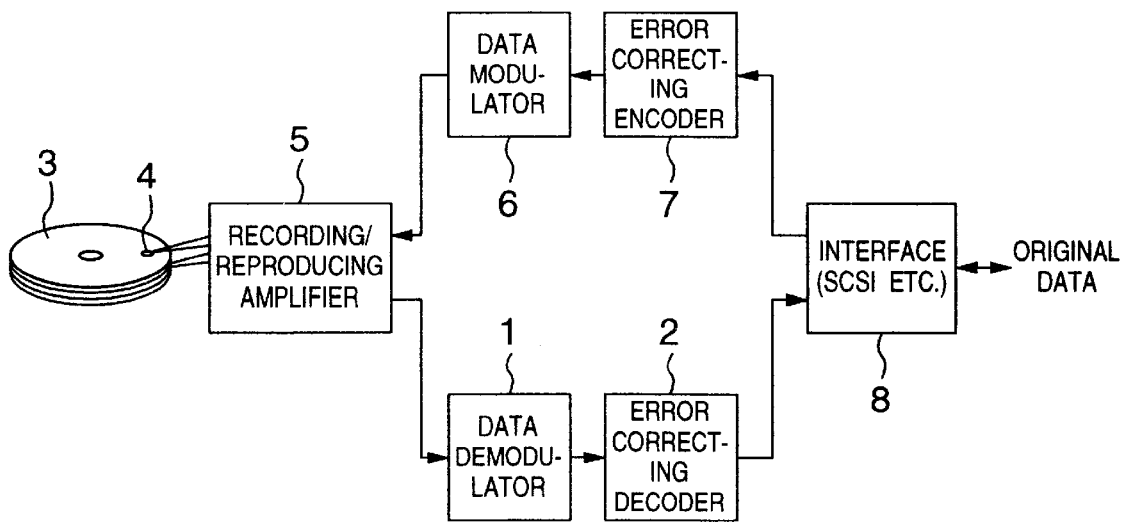
FIG. 1 is a structural diagram for indicating the conventional data demodulating circuit.
Figure 2:
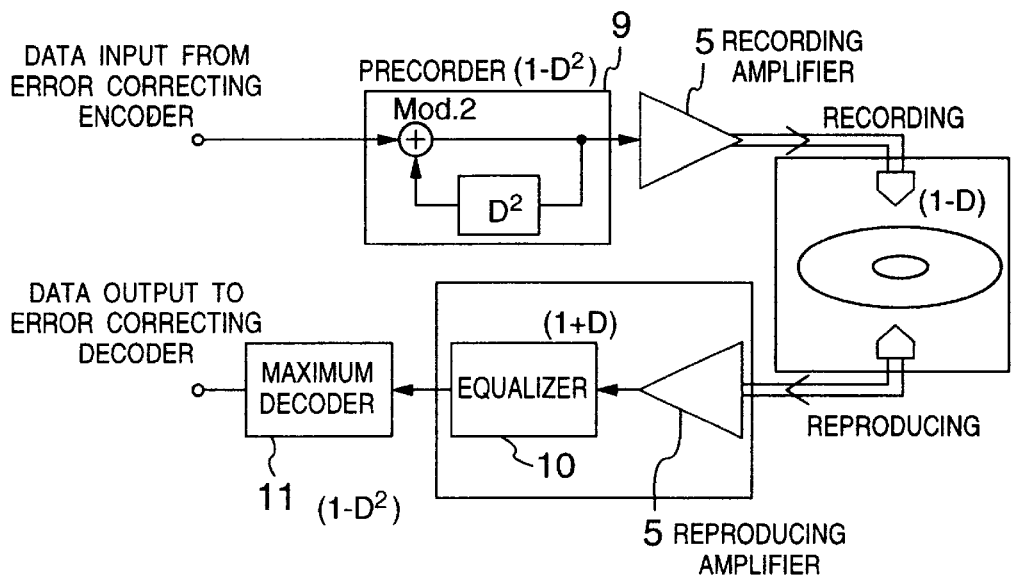
FIG. 2 is a schematic diagram for showing the relationship between the PRML demodulating system and the magnetic recording/reproducing system.
Figure 3A:
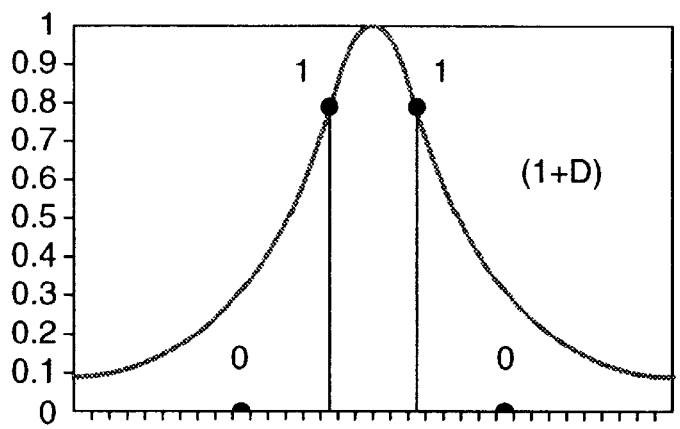
FIG. 3A, FIG. 3B, and FIG. 3C are graphic representations for showing the conventional isolated waveform response of the partial response.
Figure 3B:
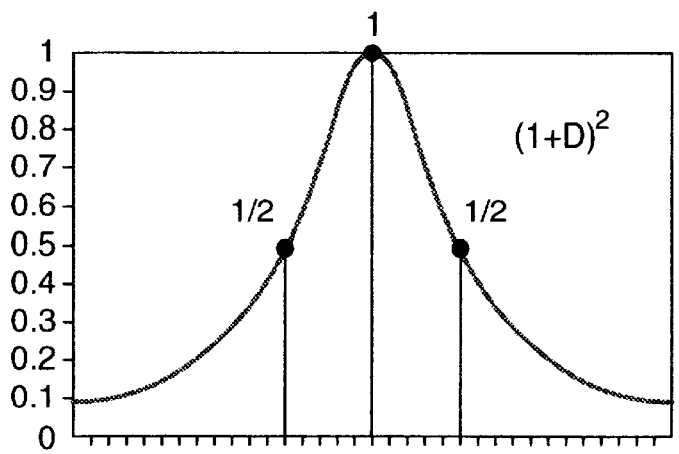
Figure 3C:
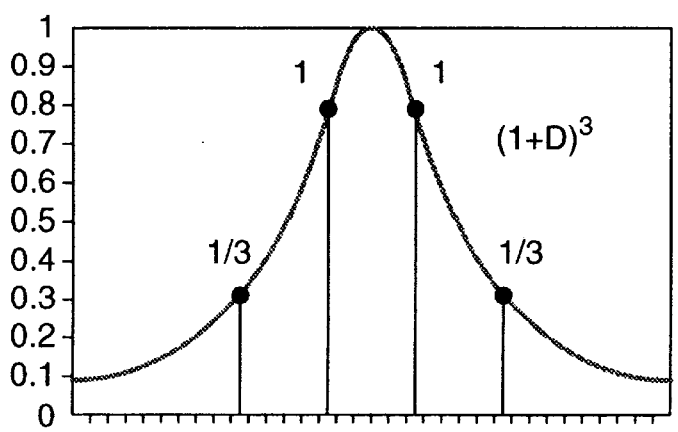
Figure 5:
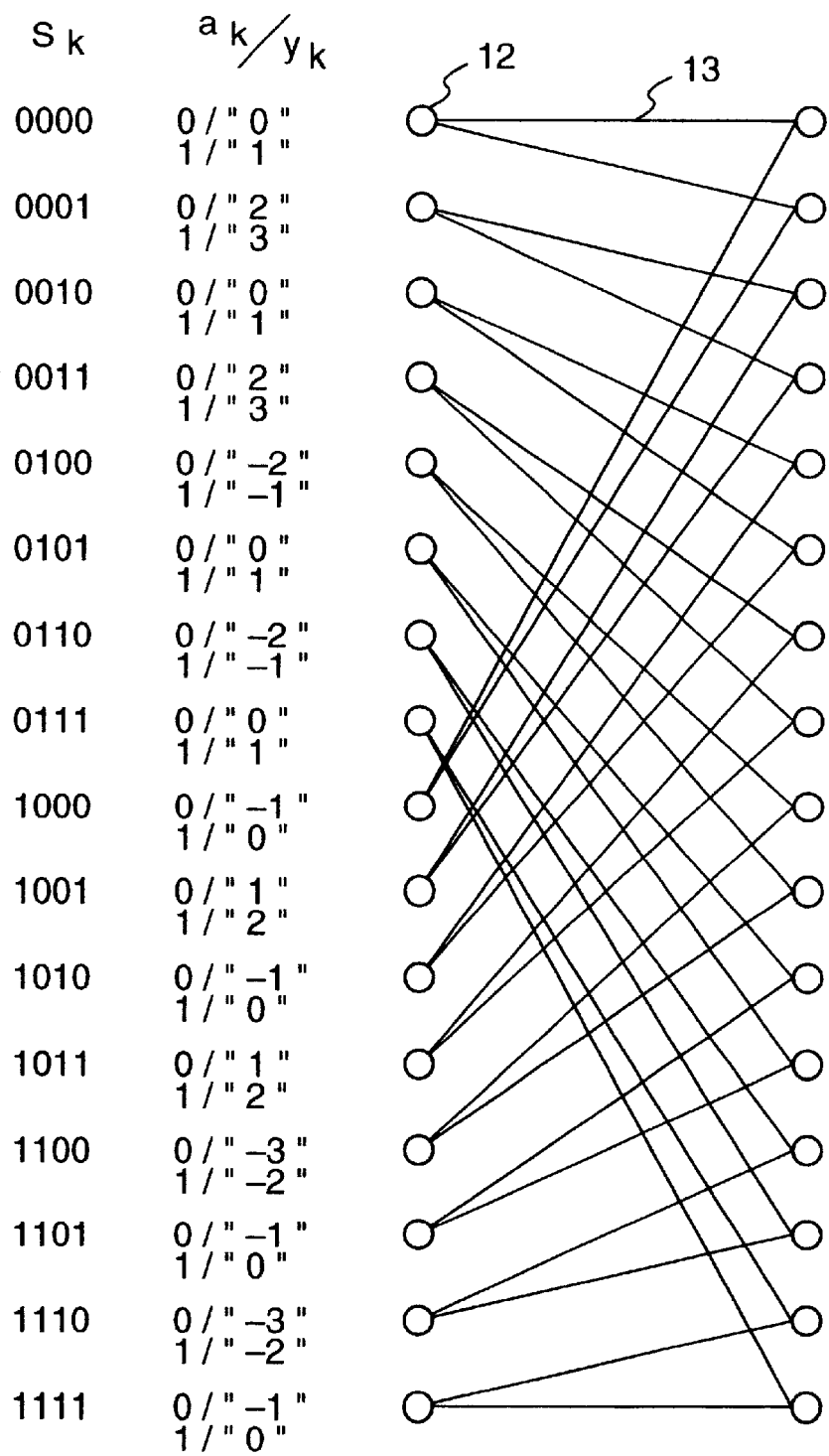
FIG. 5 represents the conventional trellis diagram of EEPRML.
Figure 6:
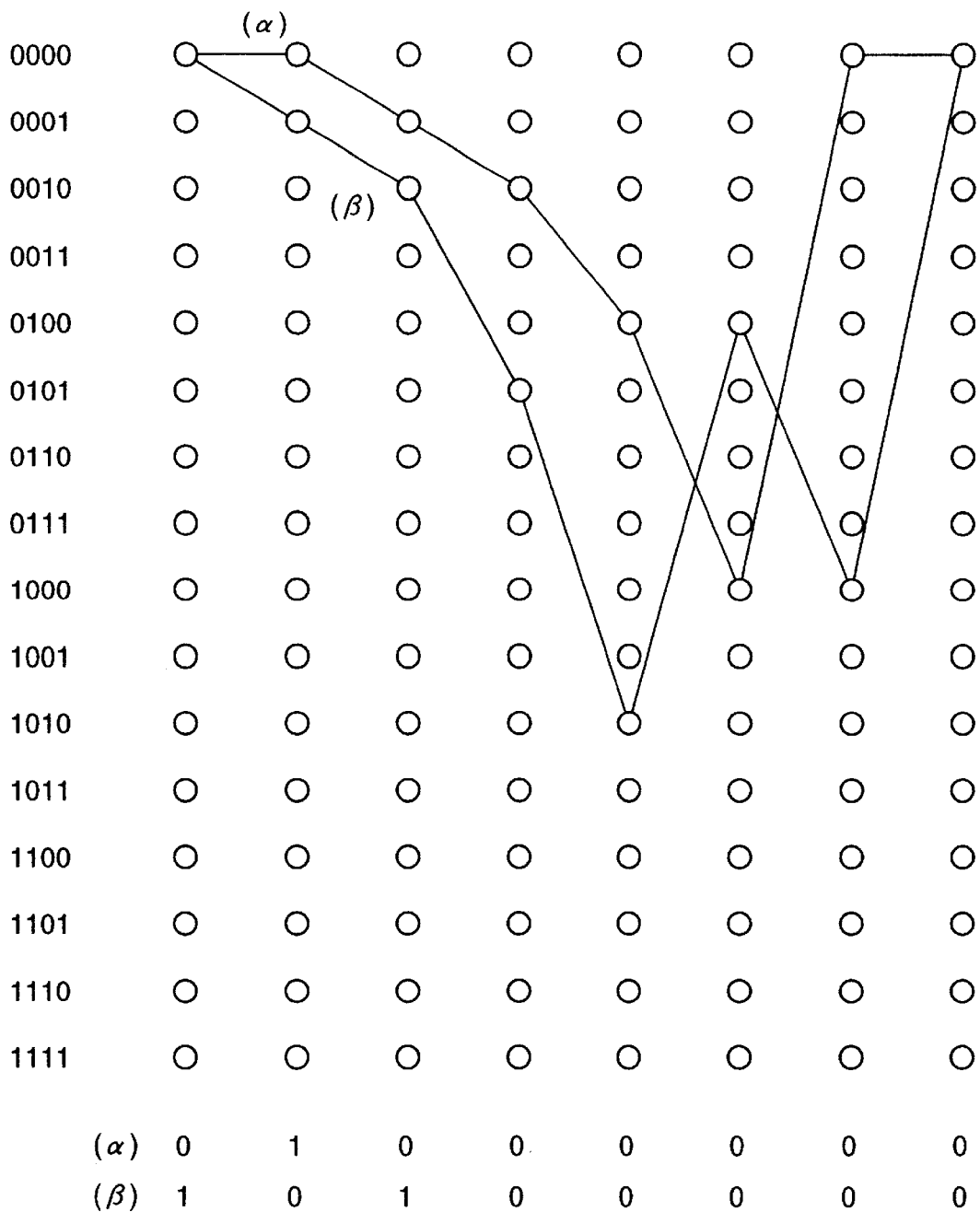
FIG. 6 shows such a diagram that the conventional pattern giving the distance between signals "6" of EEPRML is indicated on the trellis diagram.
Figure 7:
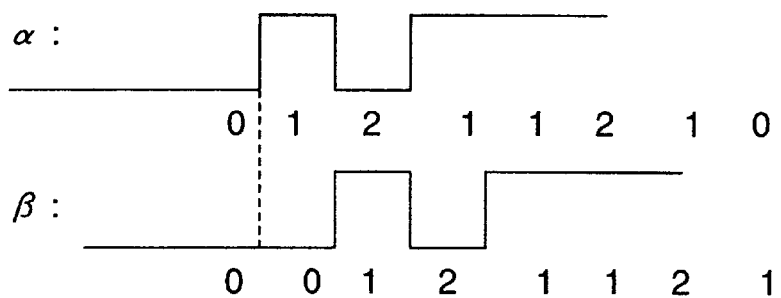
FIG. 7 indicates an example of waveforms giving a distance between signals 6 of EEPRML.
Figure 8:
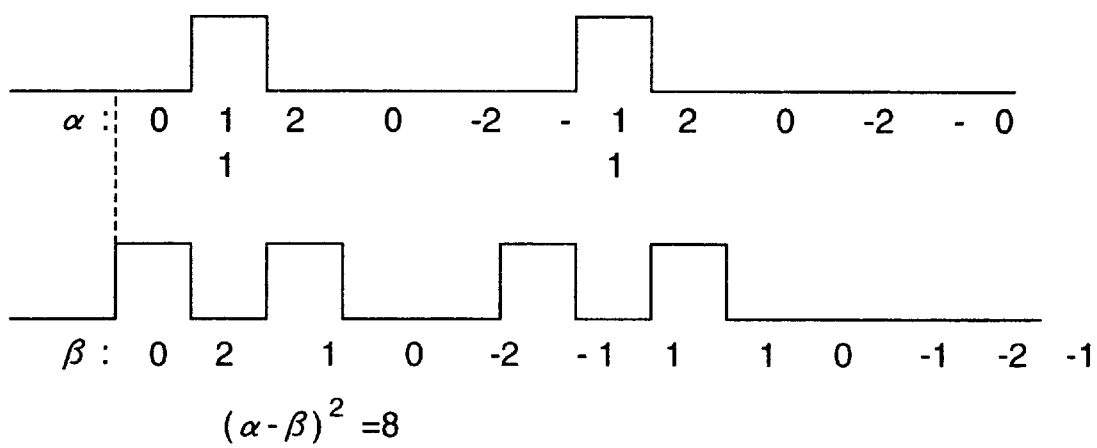
FIG. 8 indicates an example of waveforms giving a distance between signals 8 of EEPRML.
Figure 11:
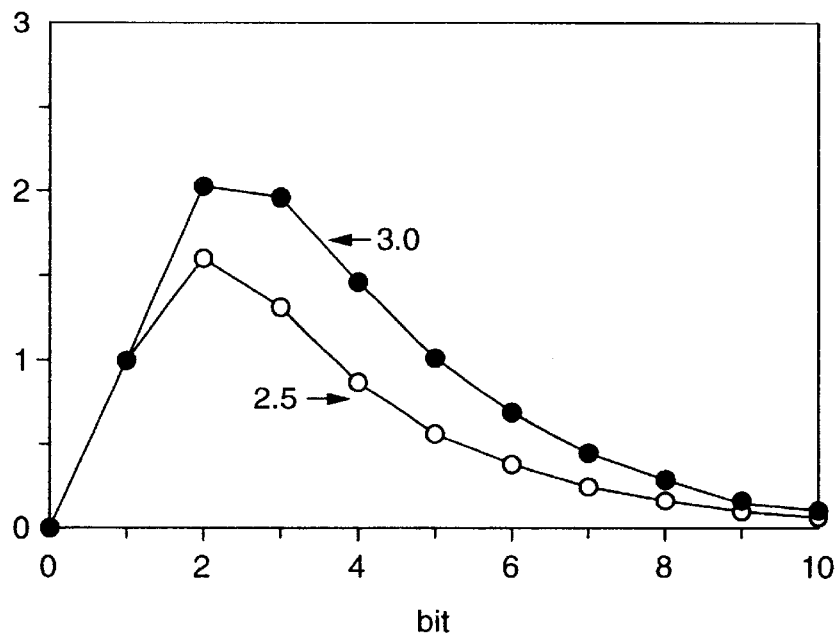
FIG. 11 is a graphic representation for representing an example of a minimum phase transition waveform according to an embodiment of the present invention.
Figure 12:
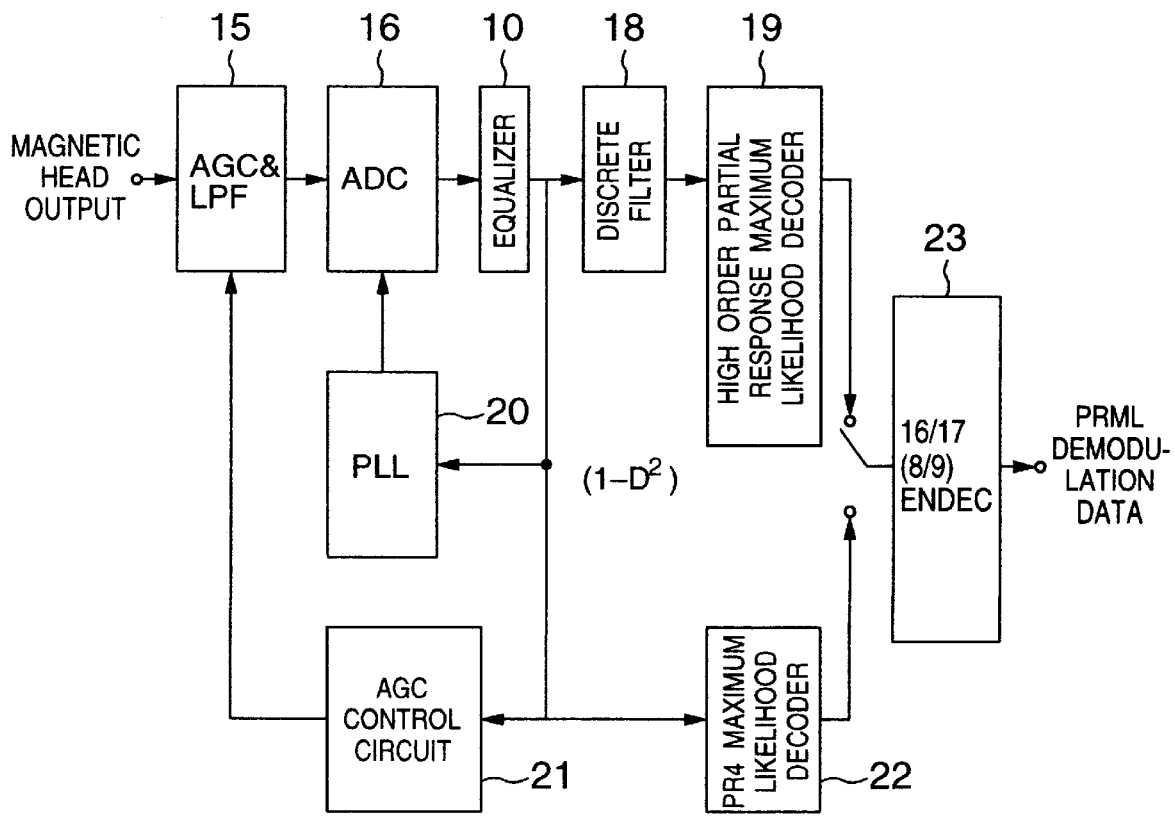
FIG. 12 is a schematic block diagram for showing a circuit arrangement according to an embodiment of the present invention.

In FIG. 12, there is shown a structural example of an actual circuit arrangement according to the present invention. First, an output of a magnetic head is supplied via a preamplifier to an AGC (automatic gain control circuit) and LPF (low-pass filter) 15. After this magnetic head output is controlled by the AGC/LPF 15 in such a manner that an amplitude of a signal becomes a constant, noise components other than a desirable frequency range are removed by this AGC/LPF 15. This LPF output signal is discrete-quantized by an ADC 16, and then the discrete-quantized signal is inputted into an equalizer 10. As previously explained, in the equalizer 10, the reproduction signal derived from the magnetic head is equalized in such a manner that this reproduction signal has a partial response characteristic of $(1-D^2)$. A clock signal required to operate the ADC 16 is produced from the output signal of this equalizer 10 by a PLL circuit 20. At the same time, a control signal of the AGC/LPF 15 is also obtained from an AGC control circuit 21. Next, an output signal of the equalizer 10 is applied to a discrete time filter 18 so as to produce such a filter output signal having a response characteristic of $(1-D^2)$ $(C_0+C_1D+ \ldots C_{nD}{}^n)$. Then, this filter output signal is supplied to a maximum likelihood decoder 19 so as to discriminate data. This discriminate data is demodulated by a 16/17 (or 8/9) ENDEC 23 to obtain original user data from an output of this 16/17 ENDEC 23. It should be understood that since the output signal of the equalizer 10 is supplied to a maximum likelihood decoder 22 of PR4, the normal PRML demodulation data is obtained. Next, an arrangement of the discrete time filter is indicated.

Figure 13A:
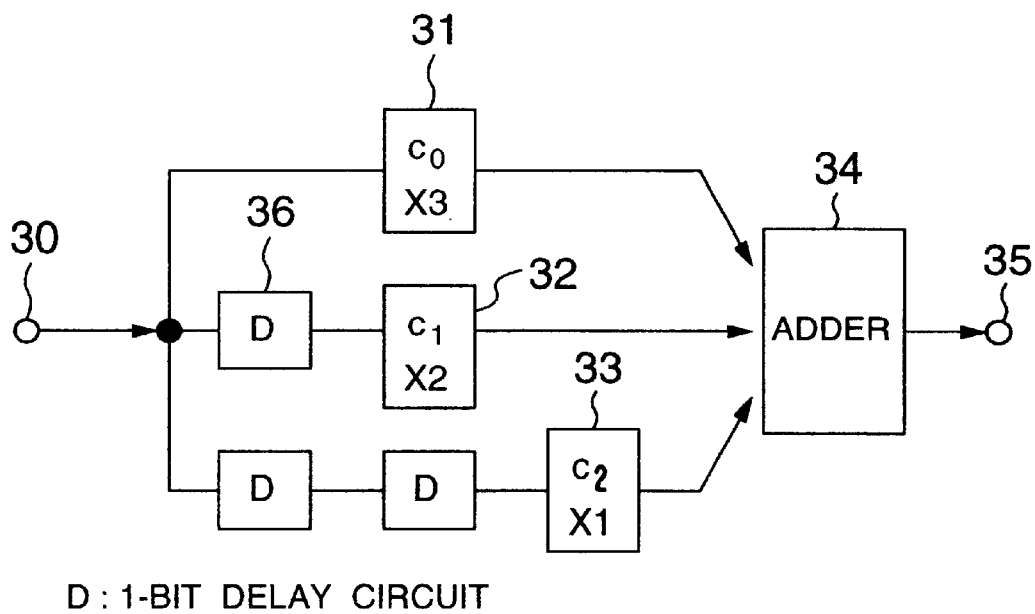
FIG. 13A and FIG. 13B are schematic block diagrams for indicating a circuit arrangement of a discrete time filter according to an embodiment of the present invention.

FIG. 13A is a structural example of a discrete time filter having such a coefficient of $(C_0=3, C_1=2, C_2=1)$. The output of the equalizer 10 is added to an input terminal 30 of the discrete time filter. An output obtained by processing this signal by a 3-time coefficient multiplier 31, another output obtained by delaying this signal by 1 bit in a delay circuit 36 to process the 1-bit delayed signal by a 2-time coefficient multiplier 32, and another output obtained by delaying this signal by 2 bits to process the 2-bit delayed signal by a 1-time coefficient multiplier 33 are added by an adder 34, so that a desirable filter Coefficient is obtained at an output terminal 35. As a result, a pulse response is given as 3, 2, -2, -2, -1 based on a formula (3). Apparently, as to other coefficients of 16 states, a discrete time filter may be similarly constructed by employing coefficients represented in a table 1.

TABLE 1

| | Coefficient | | | Distance of isolated pulse | Minimum distance | Minimum distance/ distance of isolated pulse | S/N |
|---|---|---|---|---|---|---|---|
| | $C_0$ | $C_1$ | $C_2$ | | | | |
| EEPRML | 1 | 2 | 1 | 10 | 6 | 0.60 | −0.46 dB |
| Present invention No. 1 | 6 (3 | 4 2 | 2 1) | 22 | 18 | 0.817 | 1.01 dB |
| Present invention No. 2 | 5 | 4 | 2 | 70 | 48 | 0.69 | 0.753 dB |
| Present invention No. 3 | 4 (2 | 4 2 | 2 1) | 14 | 8 | 0.57 | 0.036 dB |

Figure 13B:
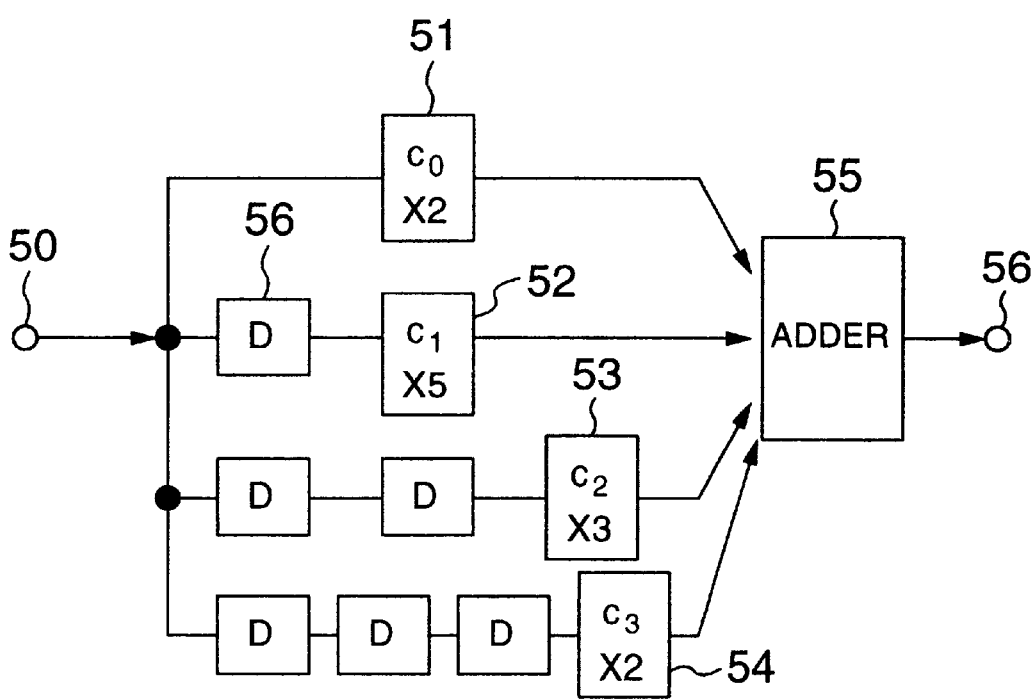
Figure 14:
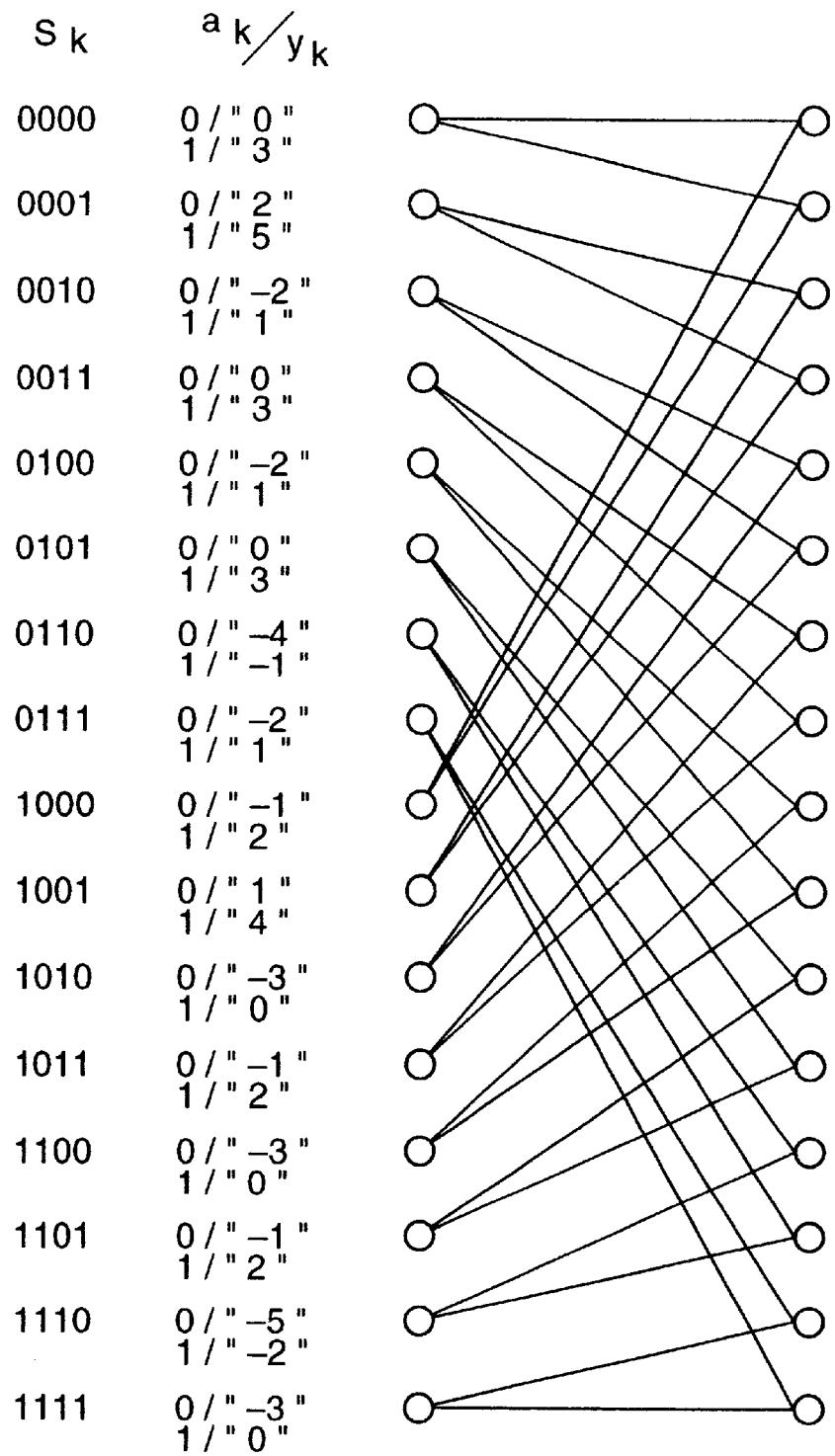
FIG. 14 is a trellis diagram having coefficients of the embodiment of the present invention.

FIG. 13B is a structural example of a discrete time filter having such a coefficient of ($C_0=2$, $C_1=5$, $C_2=3$, $C_3=2$). The output of the equalizer 10 is added to an input terminal 60 of the discrete time filter. An output obtained by processing this signal by a 2-time coefficient multiplier 51, another output obtained by delaying this signal by 1 bit in a delay circuit 56 to process the 1-bit delayed signal by a 5-time coefficient multiplier 52, another output obtained by delaying this signal by 2-bits to process the 2-bit delayed signal by a 3-time coefficient multiplier 53, and another output obtained by delaying this signal by 3 bits to process the 3-bit delayed signal by a 2-time coefficient multiplier 54 are added by an adder 55, so that a desirable filter coefficient is obtained at an output terminal 56. As a result, a pulse response is given as 2, 5, 1, −3, −3, −2 based on a formula (3). Apparently, as to other coefficients of 32 states, a discrete time filter may be similarly constructed by employing coefficients represented in a table 2.

represents one embodiment mode of the 16-state maximum likelihood decoder of FIG. 14. This processing circuit is arranged by a branch metric generating unit 40, an ACS circuit 41, and a path memory 42. This process circuit is arranged based upon the MEEPRML trellis diagram indicated in FIG. 14. The branch metric generating unit 40 is to apply a branch metric of a state transition generated from each of the states in the 215 MEEPRML trellis diagram.

The ACS circuit 41 executes an adding process, a comparing process, and a selecting process between the path metric values and the branch metric values of the 16 states, so that a path metric value with respect to a most likelihood path is generated. The path memory 42 produces decoded data based upon the comparison results of the respective states. It should be noted that the path metric is initialized by an initial setting circuit 43 when this circuit is initiated.

Figure 16:
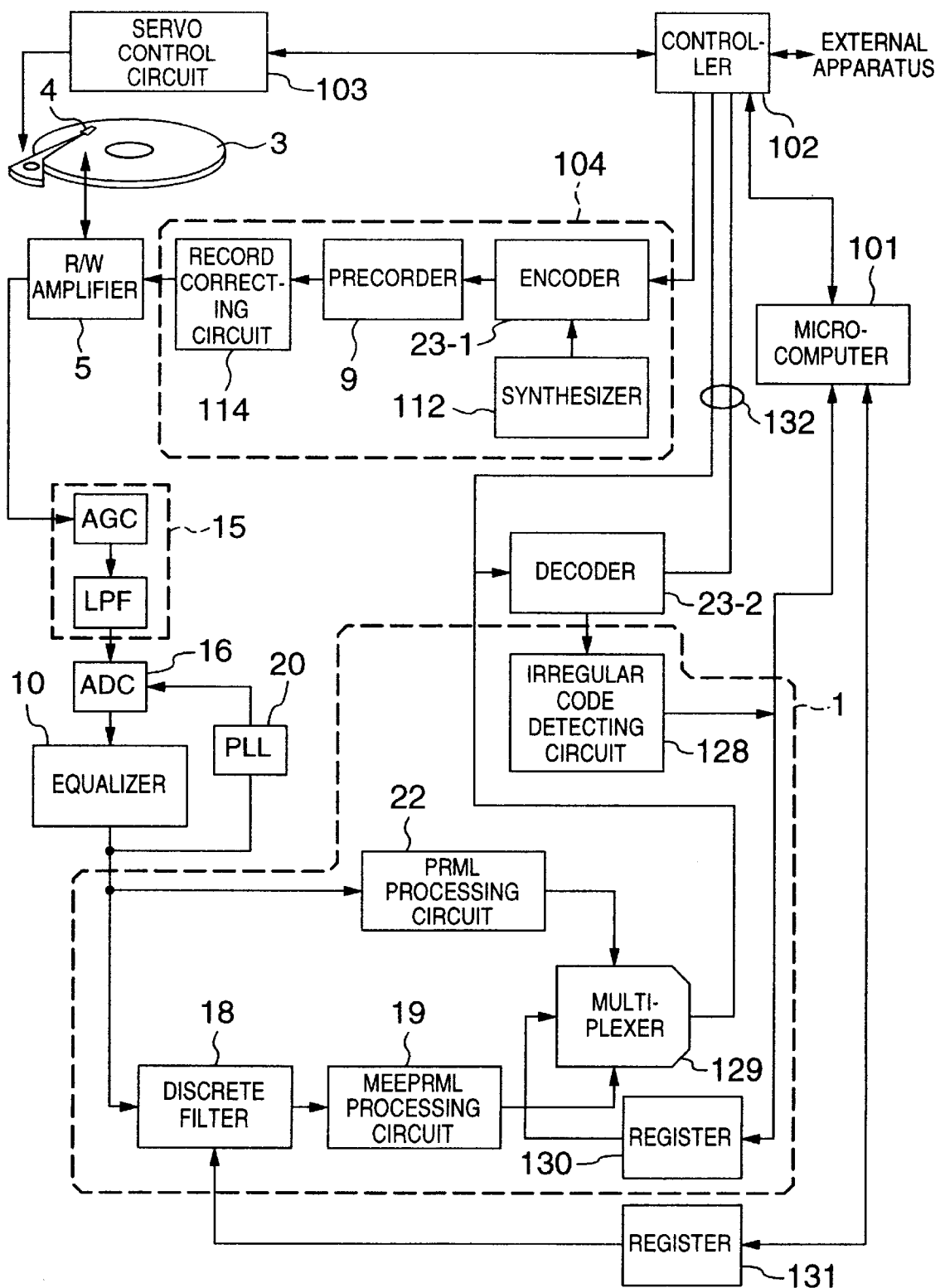
FIG. 16 schematically indicates a data demodulating method of a magnetic disk apparatus according to an embodiment of the present invention.

Next, in FIG. 16, there is shown one embodiment of a magnetic recording/reproducing apparatus with employ-

TABLE 2

| | Coefficient | | | | Distance of of isolated pulse | Minimum distance | Minimum distance/ distance of isolated pulse | S/N |
|---|---|---|---|---|---|---|---|---|
| | $C_0$ | $C_1$ | $C_2$ | $C_3$ | | | | |
| EEEPRML | 1 | 3 | 3 | 1 | 28 | 12 | 0.428 | −1.17 dB |
| Present invention No. 4 | 2 | 5 | 3 | 2 | 52 | 28 | 0.538 | 0.49 dB |
| Present invention No. 5 | 2 | 4 | 2 | 1 | 34 | 20 | 0.588 | 0.626 dB |

Next, there is shown a method for constituting a trellis diagram according to the present invention. As to a value ax of an input bit to the maximum likelihood decoder, the respective states SK, and the Output $Y_k$, the 5 below-mentioned relationship defined by the following formula (4) is established:

$$SK = a_k-5, {}^ak-4, {}^ak-3, {}^ak-2, {}^ak-1)$$

$$Y_k = C0^ak + C_1{}^ak-1 + (C_2-C_0)^ak-2 + (C_3-C_1)^ak-3 - {}^{c2}k - 4 - {}^{c3}k - 5 \quad (4)$$

Figure 15:
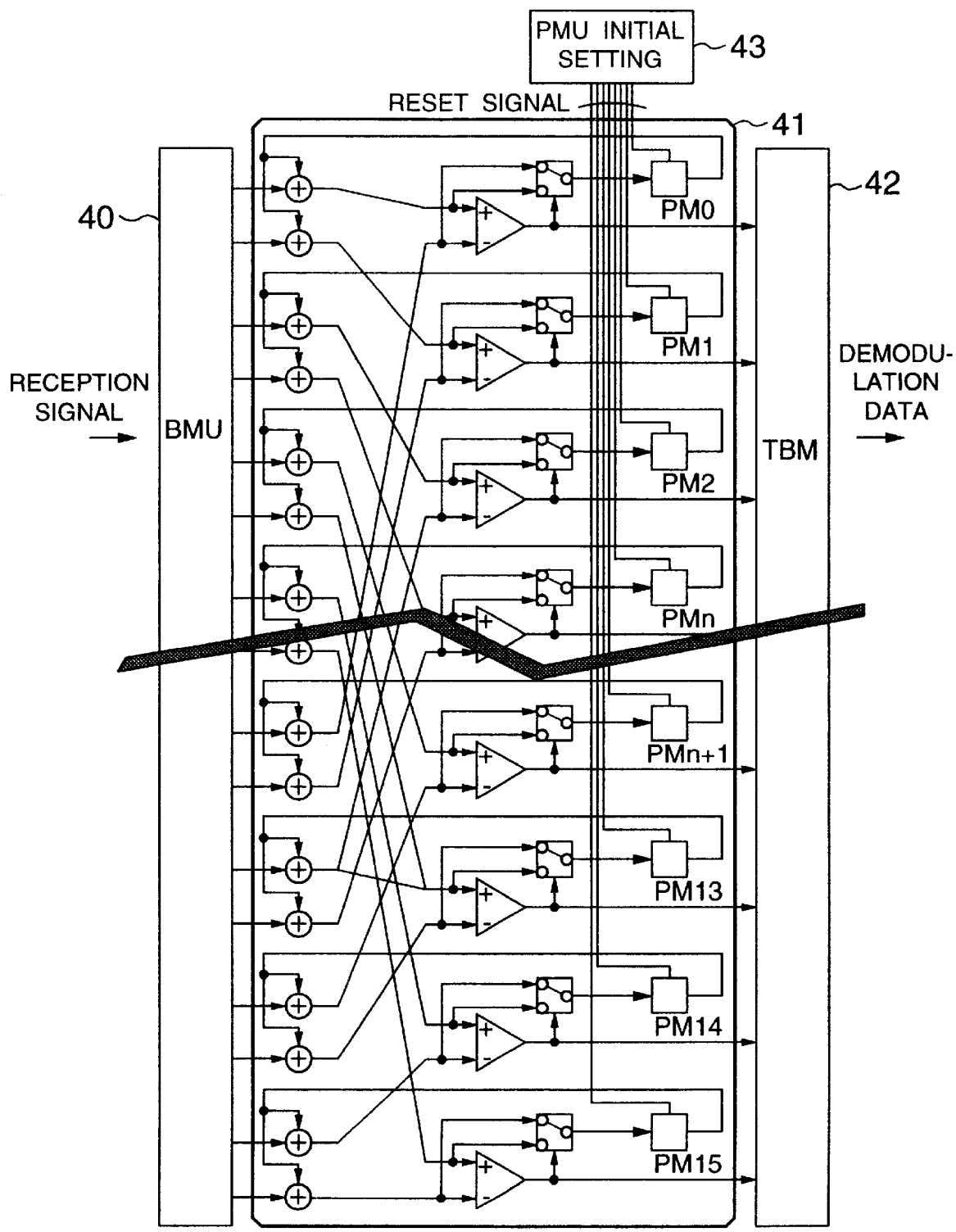
FIG. 15 schematically represents a 16-state maximum likelihood decoder as an example of the embodiment of the present invention.

The maximum likelihood decoder has 16 states in the case of $C_3=0$, and also has 32 states in the case that the value of $C_3$ is not equal to zero. In FIG. 14, there is shown a structural example of a trellis diagram of a 16-state maximum likelihood decoder having such a value of ($C_0=3$, $C_1=2$, $C_2=1$). In this case, a partial response having such a coefficient is referred to as an "MEEPRML". FIG. 15 schematically ment of the data demodulating circuit of the present invention. An external apparatus such as a personal computer transmits/receives data via a controller 102 provided in the magnetic recording/reproducing apparatus.

First, a description will now be made of such a case that data transmitted from the external apparatus is recorded. Upon receipt of a data recording instruction, the controller 102 issues an instruction to a servo control circuit 103 such that a recording/reproducing head 4 is moved to a position to be recorded (namely, track). After the transport of the recording/reproducing head is accomplished, recording data is supplied via a recording data processing circuit 104, an R/W amplifier 5, and a recording/reproducing head 4 to a recording medium 3 so as to be recorded on this recording medium 3.

The recording data processing circuit 104 is arranged by an encoder 23-1, a synthesizer 112, a precorder 9, and a record correcting circuit 114. The encoder 23-1 executes a coding process operation of the recording data in accordance with a coding rule, for example, an 8/9 GCR (0, 4/4) code conversion. An encoded data stream is sent out in response to the recording bit period of the synthesizer 112. Since the precorder 9 gives a predetermined constraint condition to the data stream, the data stream is again code-converted. The record correcting circuit 114 eliminates the nonlinear characteristic of the recording process operation specific to the magnetic recording operation. The recording process operation is carried out by executing the above-described operations.

Next, a data reproducing operation will now be described. upon receipt of a data reproducing instruction, the controller 102 issues an instruction to the servo control circuit 103 such that the recording/reproducing head 4 is moved to a position on which data has been recorded (namely, track). After the movement of the recording/reproducing head 4 has been completed, a signal recorded on the recording medium 3 is inputted via the recording/reproducing head 4 and the R/W amplifier 5 to the data demodulating circuit 1. The demodulation data demodulated by the data modulating circuit 1 is outputted to the controller 102. After the controller 102 confirms correctness of the demodulation data, the controller 102 transfer the demodulation data to the external apparatus.

The data demodulating system is arranged by the AGC circuit for making the amplitude of the head reproduction waveform constant/the band-eliminating filter (LPF) 15 for eliminating the noise outside the signal band; the ADC 16 for sampling the reproduction signal; the equalizer 10 for eliminating the interference among the codes of the reproduction waveform; the PLL 20 for determining the sampling timing of the ADC 16; the data demodulating circuit 1 functioning as a major circuit of the present invention and the decoder 23-2 for performing the decoding process (8/9 GCR decoder) of the demodulation data. The microcomputer 101 executes the process operations of the overall apparatus such as the controller 102 and the data demodulating circuit 1.

In this case, the microcomputer 101 executes the following process operations. That is, a detection of a detection result of an irregular code detecting circuit 128, and a setting operation is made of a register 130 for applying information to a multiplexer 129 for switching a PRML processing unit 22 and an MEEPRML processing unit 19. Furthermore, the data demodulating system may be alternatively arranged by adoptively switching these circuits in response to the recording density by employing another MEEPRML circuit having the coefficient listed in the table 1. This alternative arrangement may be realized by setting a desirable coefficient of the discrete time filter 18 to the register 131 by way of the microcomputer 101.

Moreover, as previously described, in accordance with the present invention, since either a 1-bit length or a 3-bit length predominantly constitutes the lengths of errors produced in the output data from the maximum likelihood decoder, the error correction suitable for this error length is carried out. Thereafter, the decoding process operation such as 8/9 GCR is performed by the decoder 23. This error correction and the decoding process operation are preferable so as to prevent the error codes from being enlarged. To this end, when the LSI of the data demodulating circuit 1 according to the present invention is constructed, there is an advantage that such a wiring line 132 is made at the LSI output terminal in such a manner that the output of the multiplexer 129 is separated into two lines, and the output of the maximum likelihood decoder before the decoding operation is directly outputted.

As previously explained, in accordance with the embodiment, since the regenerative isolated magnetized inverse waveform of the magnetic recording apparatus is changed into the asymmetrical waveform, the error propagation occurred in a specific pattern which causes the major problem in EEPRML and EEEPRML may be suppressed. As compared with the EEPRML system, the MEEPRML system may achieve an improvement of the SIN ratio higher than, or equal to approximately 1.5 dB in such a case that the ratio of a half bandwidth of the reversal of regenerative isolated-magnetization of the magnetic recording apparatus to a half bandwidth of the recording signal is on the order of 2.5, namely within the practical range of the magnetic recording apparatus. In accordance with the present invention, furthermore, the length of the code error may be improved. That is, either a single bit error or a 3-bit 5 error may mainly occur, as compared with the long/continuous bit errors occurred in the conventional EEPRML system and also the conventional EEEPRML system.

What is claimed is:

1. A data demodulating method comprising the steps of:
    inputting predetermined input data based upon a response characteristic of a partial response class 4;
    discrete-filtering said predetermined input data to thereby produce asymmetrical data; and
    maximum-likelihood-decoding said asymmetrical data to produce decoded data which is demodulated to produce demodulated data.

2. A data demodulating method as claimed in claim 1, wherein said discrete-filtering step is a phase filtering step to produce a minimum phase transition waveform.

3. A data demodulating method as claimed in claim 1, wherein said discrete-filtering step produces an asymmetrical response using integer coefficients.

4. A data demodulating method as claimed in claim 1, wherein said discrete-filtering step is set to provide a pulse response using integer coefficients selected from normalized signal values as to any one set of (5, 4, −3, −4, −2), (2, 2, −1, −2, −1), and (3, 2, −2, −2, −1).

5. A data demodulating method as claimed in claim 1, wherein said discrete-filtering step is set to provide a pulse response using integer coefficients selected from normalized signal values as to any one set of (2, 5, 1, −3, −3, −2), and (2, 4, 0, −3−, −2).

6. A data demodulating method as claimed in claim 1, further comprising a step of:
    combining any one of a 1-bit consecutive error and a 3-bit continuous error with respect to a code-error correction code.

7. A data demodulating method according to claim 1, wherein a coefficient for use in said discrete-filtering step to perform the discrete-filtering on the predetermined input data is provided by a register.

8. A data demodulating apparatus comprising:
    processing means for processing predetermined input data based upon a partial response class 4;
    a discrete time filter for discrete-filtering said processed predetermined input data output by said processing means to produce asymmetrical data;
    a maximum likelihood decoder for maximum-likelihood-decoding said asymmetrical data output by said discrete time filter to produce decoded data; and
    demodulating means for demodulating said decoded data output by said maximum likelihood decoder to produce demodulated data.

9. A data demodulating apparatus as claimed in claim 8, wherein said maximum likelihood decoder is of the partial response class 4.

10. A data demodulating apparatus as claimed in claim 8, wherein said discrete time filter includes a digital filter for converting the output of said processing means into an asymmetrical response using integer coefficients.

11. A data demodulating apparatus as claimed in claim 8, wherein said discrete time filter is set to provide a pulse response using integer coefficients selected from normalized signal values as to any one set of (5, 4, −3, −4, −2), (2, 2, −1, −2, −1), and (3, 2, −2, −2, −1).

12. A data demodulating apparatus as claimed in claim 8, wherein said discrete time filter is set to provide a pulse response using integer coefficients selected from normalized signal values as to any one set of (2, 5, 1, −3, −3, −2), and (2, 4, 0, −3, −2).

13. In a magnetic recording/reproducing apparatus for recording/reproducing a data stream, the data demodulating apparatus as claimed in claim 8 is implemented in a demodulating system.

14. A magnetic recording/reproducing apparatus as claimed in claim 13, further comprising:
    an external register connected to said discrete time filter for setting a coefficient of said discrete time filter.

15. A data demodulating apparatus according to claim 8, further comprising:
    a register connected to said discrete time filter for setting a coefficient of said discrete time filter.

16. A data demodulating apparatus comprising:
    processing means for processing predetermined input data based upon a partial response class 4 to produce processed predetermined input data;
    clock signal means for producing a clock signal based on said processed predetermined input data,
    wherein said processing means operates based on said clock signal produced by said clock signal means;
    a discrete time filter for discrete time filtering said processed predetermined input data to produce asymmetrical data;
    a maximum likelihood decoder for maximum likelihood decoding said asymmetrical data to produce decoded data; and
    demodulating means for demodulating said decoded data to produce demodulated data.

* * * * *